United States Patent [19]

Liebert et al.

[11] 4,258,902

[45] Mar. 31, 1981

[54] STEERING VALVE WITH ANNULAR SEALING ELEMENT FOR RADIAL ANNULAR GAP

[75] Inventors: Karl-Heinz Liebert, Schwabisch Gmund; Werner Tischer, Bobingen, both of Fed. Rep. of Germany

[73] Assignee: Zahnradfabrik Friedrichshafen, AG., Friedrichshafen, Fed. Rep. of Germany

[21] Appl. No.: 79,839

[22] Filed: Sep. 28, 1979

[30] Foreign Application Priority Data

Sep. 30, 1978 [DE] Fed. Rep. of Germany ....... 2842734

[51] Int. Cl.³ .............................................. F16K 41/00
[52] U.S. Cl. ...................................... 251/214; 277/30; 277/81 R; 277/188 R; 277/189
[58] Field of Search .................. 251/214; 277/35, 102, 277/81 R, 85, 83, 188 A, 188 R, 189, 181, 30

[56] References Cited

U.S. PATENT DOCUMENTS

| | | | |
|---|---|---|---|
| 1,437,262 | 11/1922 | Newkirk | 277/102 |
| 2,825,590 | 3/1958 | Sutherland | 277/35 |
| 2,935,365 | 5/1960 | Dega | 277/188 R |
| 3,247,767 | 4/1966 | Aslan | 251/214 |
| 3,351,350 | 11/1967 | Shepler | 277/188 R |
| 3,469,853 | 9/1969 | Gullick | 277/188 R |
| 3,599,991 | 8/1971 | Combes | 251/214 |
| 3,905,608 | 9/1975 | Olsen et al. | 277/188 R |
| 4,111,392 | 9/1978 | Edelmann | 251/214 |

*Primary Examiner*—Martin P. Schwadron
*Assistant Examiner*—G. L. Walton
*Attorney, Agent, or Firm*—Zalkind & Shuster

[57] ABSTRACT

An annular gap between a valve shaft and the bore in a valve body of a steering control valve is dimensioned to accommodate relative eccentricity of parts and is sealed by a sealing gland having a rigid annular element rotatable with the valve shaft. The annular element is formed with recesses seating resilient sealing elements respectively engaging the valve shaft and an axial abutment surface of the valve body. The sealing elements are prestressed in radial directions and axial directions, respectively.

10 Claims, 2 Drawing Figures

STEERING VALVE WITH ANNULAR SEALING ELEMENT FOR RADIAL ANNULAR GAP

BACKGROUND OF THE INVENTION

This invention relates to an improvement in a control valve assembly for a hydrostatic fluid power steering system.

Hydrostatic auxiliary power steering systems having at least one rotatable slide valve element operated by a valve shaft extending from a valve body, is already well known. In this type of valve assembly, an outer distributor slide valve is rotatably mounted within a bore of the valve body while an inner reversing slide valve element is rotatably mounted within a bore of the outer distributor valve. The reversing valve is formed in one piece with the valve shaft. The shaft extends externally of the valve body through an exit bore with radial clearance. The annular gap between the exit bore and the valve shaft is sealed at one axial end by a pressure tight, annular sealing gland. The sealing gland includes a resilient O-ring element having a useful life of substantial duration only when there is a relatively small radial clearance between the bore and the shaft. Where the radial clearance is relatively large, the sealing element is destroyed by gap extrusion.

Where one or more slide valve elements are utilized, the valve elements must be mounted within the valve body with a relatively tight sliding fit. However, because of manufacturing imperfections, there is a certain amount of eccentricity between the valve surfaces and shaft and the associated valve bores and shaft exit bore. To avoid jamming between the relatively movable parts, the radial clearance between the valve shaft and exit bore must be made relatively large. However, any enlargement of the radial clearance necessary to avoid jamming often leads to destruction of the sealing element by gap extrusion as aforementioned.

An attempt to solve the foregoing problem is proposed in U.S. Pat. No. 3,785,661 to White. According to the White patent, a relatively large radial clearance is provided between a rotatable shaft and an exit bore in the housing through which it extends forming a gap filled by an annular sealing gasket. The gasket at one axial end is acted upon by pressurized fluid in an operating chamber while its other axial end is supported by an annular disk that extends into the exit bore with little radial clearance. The annular disk is supported by an element seated on the shaft with a tight fit. The support element and the annular disk therefore both undergo eccentric movement during operation and the annular gasket is radially and periodically compressed and elongated. As a result, the annular gasket undergoes a squeezing action at the radially inner edge of the annular disk resulting in damage thereto.

It is therefore an important object of the present invention to provide a steering control valve assembly with a substantial amount of radial clearance between the valve shaft and the exit bore of the valve body without causing damage to the sealing element during operation of the control valve assembly. A further object in accordance with the foregoing object is to provide a control valve arrangement which avoids the seal destruction problem with a relatively simple construction having low production and assembly costs.

SUMMARY OF THE INVENTION

In accordance with the present invention, the radial gap between the valve shaft and exit bore of a valve body associated with a control valve assembly, is provided with sufficient radial clearance to accommodate any eccentricity between the valve shaft, the valve elements and associated valve bores and exit bore. The radial gap is sealed at an inner axial end by a support ring that is tightly fitted onto the valve shaft and made of a relatively rigid material. The support ring is axially positioned between a valve element and an axial abutment surface of the valve body. Recesses in the support ring form an inner annular chamber that surrounds the outer cylindrical surface of the valve shaft and an outer annular chamber closed by the axial abutment surface of the valve body facing the support ring. A radially prestressed O-ring element is positioned within the radially inner chamber while an axially prestressed O-ring element is positioned within the radially outer chamber. While the rigid support ring undergoes radial movement with the valve shaft during its rotation relative to the valve body, neither of the two O-ring seal elements have any exposed edges capable of being extruded into the radial gap between the valve shaft and the exit bore of the valve body. The radially inner O-ring seal element is merely compressed in a radial direction periodically while the radial outer O-ring seal element undergoes periodic radial shear strain. Both compressive and shear loadings applied to the O-ring elements are within the rated load capacities of the O-ring seal material so that such loading does not lead to any premature wearing of the O-ring elements.

The compressive end shearing strains imposed on the annular O-ring seal elements are minimized by the formation of the recesses in the rigid supporting ring by cylindrical surfaces and radial plane surfaces. By having the annular chambers formed by said recesses open axially inwardly and radially outwardly, respectively, manufacture of the supporting ring and the assembly of the control valve is further simplified.

BRIEF DESCRIPTION OF DRAWING FIGURES

An embodiment of the invention is hereinafter described with reference to the drawings, wherein.

DETAILED DESCRIPTION OF PREFERRED EMBODIMENT

Figure 1:
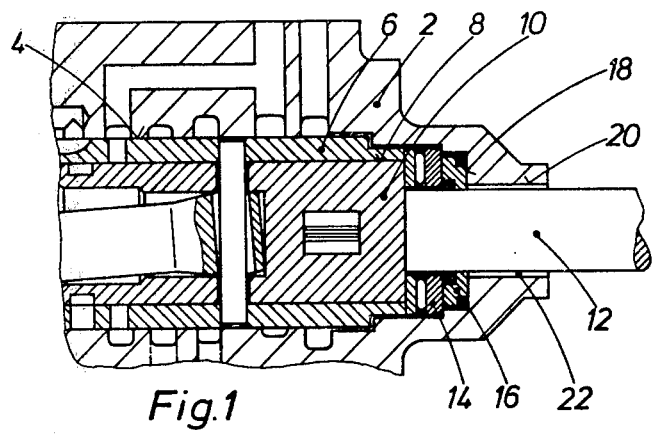
FIG. 1 is a side section view through a portion of a steering control valve assembly embodying a sealing gland in accordance with the present invention.

Referring now to the drawings in detail, a portion of a control valve assembly for a hydrostatic auxiliary power steering mechanism is shown. The valve assembly includes a housing or valve body 2 having a bore formed therein generally referred to by reference numeral 4. The bore 4 receives with a tight sliding fit, an outer rotatable valve element 6 within which a valve bore 8 is formed. An inner slide valve element 10 is rotatably mounted with a tight sliding fit within the valve bore 8. The inner valve element 10 is formed integrally with a valve shaft 12 and is rotatably supported within the housing 2 by means of an axial thrust bearing 14 and sealing gland 16 in engagement with an axial abutment shoulder surface 18. The valve shaft 12 extends through an exit bore 20 of the housing having a radial clearance gap 22 relative to the shaft in order to accommodate any eccentric movement of the shaft or valve elements connected thereto.

Figure 2:
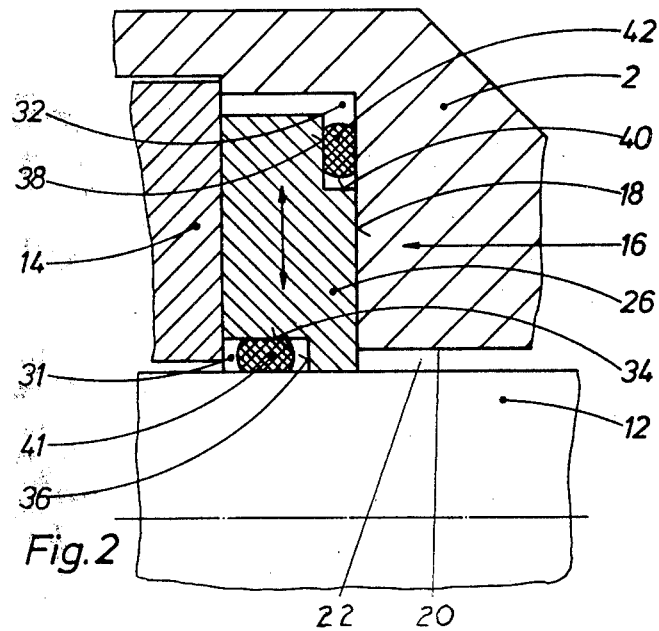
FIG. 2 is an enlarged section view corresponding to a portion of FIG. 1 showing the sealing gland.

As more clearly seen in FIG. 2, the sealing gland 16 includes a rigid, annular supporting ring 26 made of steel, for example, having a radially inner recess enclosing an annular chamber 31 about the valve shaft 12 and a radially outer recess enclosing an annular chamber 32. The recess enclosing annular chamber 31 is defined by a cylindrical surface 34 and a radial plane surface 36. The radially outer recess enclosing chamber 32, on the other hand, is defined by a radial plane surface 38 and a cylindrical surface 40. A resilient O-ring sealing element 41 is seated within chamber 31 while an O-ring sealing element 42 is seated within chamber 32. The annular O-ring sealing element 41 is prestressed in a radial direction while the annular O-ring sealing element 42 is prestressed in an axial direction as shown.

During rotation of the valve shaft 12 with the annular supporting ring 26, periodical radial movement within the housing 2 occurs as a result of some degree of relative eccentricity. Under such conditions, the seal ring 41 is periodically compressed in a radial direction while the seal ring 42 periodically undergoes a shearing strain in the same radial direction. The loading imposed thereby on the O-rings 41 and 42 is well within the capacity of the resilient O-ring material. Further, the O-rings will effectively seal the inner end of the annular gap 22 without being physically exposed thereto inasmuch as the O-ring 41 is axially spaced from the gap 22 while the O-ring 42 is radially spaced from the gap 22 by slide bearing surfaces of the support ring 26 having tight sliding fits relative to the shaft 20 and abutment surface 18, respectively.

What is claimed is:

1. In a control valve assembly having a valve body (2) rotatably mounting at least one valve element from which a rotatable valve shaft (12) extends externally through a bore (20) formed in the valve body, said bore being dimensioned relative to the shaft to form an annular gap accommodating eccentric movement of the valve element and shaft relative to the valve body and bore, the improvement residing in a sealing gland (16) axially positioned between an axial abutment surface (18) of the valve body and said valve element for sealing said annular gap (22), comprising a rigid support ring (26) encircling said shaft and radially displaceable therewith within the valve body in response to said eccentric movement, said support ring being formed with a radially inner recess enclosing an annular chamber (31) opening onto the valve shaft and a radially outer recess enclosing an annular chamber (32) opening onto said abutment surface of the valve body, a radially prestressed sealing element (41) seated within the radially inner recess in engagement with the shaft, and an axially prestressed sealing element (42) seated within the radially outer recess in engagement with the axial abutment surface and said support ring being displaceable by said shaft without affecting the prestress of the sealing elements.

2. The control valve assembly as defined in claim 1 wherein said recesses are formed by cylindrical surfaces (34, 40) and radial plane surfaces (36, 38) of the rigid support ring.

3. The control valve assembly as defined in claim 2 wherein the annular chamber (31) enclosed by the radially inner recess opens in an axial direction toward the valve element.

4. The control valve assembly valve as defined in claim 3 wherein the annular chamber (32) enclosed by the radially outer recess opens radially outward.

5. The control valve assembly as defined in claim 4 wherein said sealing elements (41, 42) are O-rings.

6. The control valve assembly as defined in claim 1 wherein the annular chamber (31) enclosed by the radially inner recess opens in an axial direction toward the valve element.

7. The control valve assembly as defined in claim 6 wherein the annual chamber (32) enclosed by the radially outer recess opens radially outward.

8. The control valve assembly as defined in claim 1 wherein the annular chamber (32) enclosed by the radially outer recess opens radially outward.

9. The control valve assembly as defined in claim 1 wherein said sealing elements (41, 42) are O-rings.

10. A sealing assembly for a control valve having a valve body (2) from which a rotatable valve shaft (12) extends through an axial bore (20) with radial clearance forming an annular gap (22) about the shaft terminated at an axial abutment surface (18) within the valve body, comprising a rigid annular support element (26) radially displaceable with said shaft in response to eccentric movement thereof having at least two recesses (31, 32) formed therein and a pair of annular sealing elements (41, 42) seated within said recesses in engagement with the shaft and the axial abutment surface, respectively, under radial and axial prestress and said support element being displaceable by said shaft without affecting the prestress of the sealing elements.

* * * * *